United States Patent
Toyoda et al.

(10) Patent No.: US 9,080,069 B2
(45) Date of Patent: Jul. 14, 2015

(54) COMPOSITION FOR INKJET AND RECORDING MATERIAL

(71) Applicant: SEIKO EPSON CORPORATION, Tokyo (JP)

(72) Inventors: Naoyuki Toyoda, Nagano (JP); Masaya Shibatani, Nagano (JP); Minoru Yamada, Nagano (JP); Tomohiro Ogawa, Nagano (JP); Hidekazu Moriyama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/738,396

(22) Filed: Jan. 10, 2013

(65) Prior Publication Data
US 2013/0196127 A1 Aug. 1, 2013

(30) Foreign Application Priority Data
Feb. 1, 2012 (JP) ................. 2012-020357

(51) Int. Cl.
*C09D 11/30* (2014.01)
*C09D 11/322* (2014.01)

(52) U.S. Cl.
CPC .............. *C09D 11/30* (2013.01); *C09D 11/322* (2013.01)

(58) Field of Classification Search
CPC ....................................................... C09D 11/00
USPC ................................................. 523/160, 161
See application file for complete search history.

(56) References Cited

U.S. PATENT DOCUMENTS

| | | | |
|---|---|---|---|
| 6,340,723 B1 * | 1/2002 | Nitta et al. ............ | 524/430 |
| 6,808,271 B1 | 10/2004 | Kurematsu | |
| 2002/0096087 A1 | 7/2002 | Glausch | |
| 2003/0199655 A1 | 10/2003 | Yurugi et al. | |
| 2004/0214945 A1 | 10/2004 | Uozumi | |
| 2006/0000389 A1 | 1/2006 | Duguet et al. | |
| 2006/0063004 A1 | 3/2006 | Takano et al. | |
| 2008/0081124 A1 | 4/2008 | Sano et al. | |
| 2008/0081864 A1 | 4/2008 | Takano | |
| 2009/0075036 A1 | 3/2009 | Itano et al. | |
| 2009/0110827 A1 | 4/2009 | Nakano et al. | |
| 2009/0208651 A1 | 8/2009 | Oyanagi et al. | |
| 2009/0220695 A1 * | 9/2009 | Oyanagi et al. ............ | 427/256 |
| 2009/0280302 A1 | 11/2009 | Fukumoto et al. | |
| 2010/0026751 A1 | 2/2010 | Oyanagi | |
| 2010/0075119 A1 | 3/2010 | Ohnishi | |
| 2010/0279083 A1 | 11/2010 | Trummer et al. | |
| 2010/0330296 A1 | 12/2010 | Loccufier et al. | |
| 2011/0008613 A1 | 1/2011 | Takano et al. | |
| 2011/0014440 A1 | 1/2011 | Itano et al. | |
| 2012/0229583 A1 | 9/2012 | Fukumoto et al. | |
| 2012/0295076 A1 | 11/2012 | Toyoda et al. | |
| 2012/0295082 A1 | 11/2012 | Toyoda et al. | |

FOREIGN PATENT DOCUMENTS

| | | |
|---|---|---|
| JP | 10-219150 A | 8/1998 |
| JP | 2001-106937 A | 4/2001 |
| JP | 2001-108937 A | 4/2001 |
| JP | 2001-164150 A | 6/2001 |
| JP | 2001-192618 A | 7/2001 |
| JP | 2002-194247 A | 7/2002 |
| JP | 2006-501345 A | 1/2006 |
| JP | 2006-169393 A | 6/2006 |
| JP | 2008-088228 A | 4/2008 |
| JP | 2009-057548 A | 3/2009 |
| JP | 2009-091550 A | 4/2009 |
| JP | 2009-215411 A | 9/2009 |
| JP | 2010-018730 A | 1/2010 |
| JP | 2010-030139 A | 2/2010 |
| JP | 2010-077228 A | 4/2010 |
| JP | 2010-242037 A | 10/2010 |
| JP | 2011-012253 A | 1/2011 |
| JP | 2011-046115 A | 3/2011 |
| JP | 2011-508030 A | 3/2011 |
| JP | 2011-137083 A | 7/2011 |
| WO | 2005/007755 A1 | 1/2005 |

* cited by examiner

*Primary Examiner* — Doris Lee
(74) *Attorney, Agent, or Firm* — Global IP Counselors, LLP

(57) ABSTRACT

A composition for inkjet adapted to be discharged by an inkjet method includes a metal powder, an organic solvent, and a binder resin. The metal powder is treated by a surface preparation with a fluorinated silane compound and/or a fluorinated phosphate ester as a surface preparation agent.

12 Claims, No Drawings

COMPOSITION FOR INKJET AND RECORDING MATERIAL

CROSS-REFERENCE TO RELATED APPLICATIONS

This application claims priority to Japanese Patent Application No. 2012-020357 filed on Feb. 1, 2012. The entire disclosure of Japanese Patent Application No. 2012-020357 is hereby incorporated herein by reference.

BACKGROUND

1. Technical Field

The present invention relates to a composition for inkjet and a recording material.

2. Background Technology

Conventionally, a metallic plating, a stamp-printing by using a metallic foil, a thermal transfer by using a metallic foil, or the like have been used as a production method of a decorative product presenting glossy appearance. However, in these methods, problems appeared such that it was difficult to form a fine pattern and it was difficult to perform an application to a curved surface part. Also, in the stamp-printing, it had a low on-demand characteristic so that it was not appropriate for the high multi-production. In addition, a problem appeared such that a metal kind of gradation cannot be printed.

On the other hand, as a recording method to a recording medium by using compositions including pigments or colorants, an inkjet method is used. The inkjet method provides excellent formation of the fine pattern and also, it is appropriate to perform an application to the curve surface part. Specifically, the composition (composition for inkjet) that the coloring agent (pigments or colorants) was dispersed or dissolved in an organic solvent is used so that it has advantages such that the thickness of a print layer becomes smaller, and it can be prevented from an occurrence of unnecessary roughness (see, for example, Japanese Laid-Open Patent Publication No. 2010-18730). However, in the composition for inkjet, when the metal powder was used instead of the pigments or colorants, a problem appeared that the glossy appearance, which is originally included in a characteristic of a metal, cannot be sufficiently demonstrated. Also, it caused problems such as a poor stability (storage stability) of the composition and the deterioration of the discharge stability caused by increasing the viscosity by the gelation.

SUMMARY

The object of the present invention is to provide the composition for inkjet with excellent discharge stability and excellent storage stability and to provide the composition for inkjet which can be appropriately used to form a pattern (printing part) with excellent glossy appearance. Also, the object of the present invention is to provide a recording material having a pattern with excellent glossy appearance by using the composition for inkjet.

These objects are achieved by the present invention as discussed below. The composition for inkjet in the present invention is discharged by the inkjet method. The composition for inkjet comprises a metal powder, an organic solvent, and a binder resin; and wherein the metal powder is treated by a surface preparation with a fluorinated silane compound and/or a fluorinated phosphate ester as a surface preparation agent. Because of this, the composition for inkjet can be provided with excellent discharge stability and excellent storage stability, and it can be appropriately used for producing a recording material having a pattern (printing part) with excellent glossy appearance.

In the composition for inkjet of the present invention, it is preferable that in the metal powder, at least vicinity surface of the powder mainly constitutes Al and the surface is treated by a surface preparation with the fluorinated silane compound and/or the fluorinated phosphate ester. Among the various metal materials, Al originally has excellent glossy appearance, but the present inventors have discovered problems such that when the powder constituting Al was used for the composition for inkjet, the storage stability of the composition for inkjet became low significantly and the deterioration of the discharge stability occurred because the viscosity was increased by the gelation. On the other hand, in the present invention, even when the powder constituting Al on the surface is used, the occurrence of the above problems can be properly prevented. That is, the effect of the present invention is significantly demonstrated when the composition for inkjet includes the metal powder and at least the surface of the powder mainly constituting Al is treated by the fluorinated silane compound and/or the fluorinated phosphate ester.

In the composition for inkjet of the present invention, it is preferable that the metal powder has a scale-like shape. Because of this, the recording material produced by using the composition for inkjet can be provided with particular excellent glossy appearance and particular excellent abrasion resistance.

In the present invention, the composition for inkjet preferably includes the metal powder that is treated by the surface preparation with the fluorinated silane compound having a chemical formula shown in formula (1) below.

$$R^1SiX^1_aR^2_{(3-a)} \tag{1}$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.) Because of this, the composition for inkjet can be provided with particular excellent discharge stability and particular excellent storage stability, and the recording material produced by using the composition for inkjet can be provided with particular excellent glossy appearance and particular excellent abrasion resistance.

In the present invention, the composition for inkjet preferably includes the metal powder that is treated by the surface preparation with the fluorinated phosphate ester having a chemical formula shown in formula (2) below.

$$POR_n(OH)_{3-n} \tag{2}$$

(In formula (2), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$ or $CF_3(CF_2)_m(CH_2)_lO-$, n represents an integer between 1 to 3, m represents an integer between 2 to 18, and l represents an integer between 1 to 18.) Because of this, the composition for inkjet can be provided with particular excellent discharge stability and particular excellent storage stability, and the recording material produced by using the composition for inkjet can be provided with particular excellent glossy appearance and particular excellent abrasion resistance.

In the composition for inkjet of the present invention, it is preferable that the surface preparation agent has a perfluoroalkyl structure. Because of this, the composition for inkjet is further secured with excellent discharge stability and excellent storage stability, and the recording material produced by using the composition for inkjet can be provided with excellent glossy appearance and excellent abrasion resistance.

In the composition for inkjet of the present invention, it is preferable that the average grain diameter of the metal powder is more than 500 nm and less than 3.0 μm. Because of this, the recording material produced by using the composition for inkjet can be provided with excellent glossy appearance and excellent high-class appearance. Also, the composition for inkjet can be provided with excellent storage stability and excellent discharge stability.

In the composition for inkjet of the present invention, the organic solvent preferably includes at least one compound selected from alkylene glycol compounds and lactone compounds. Because of this, the composition for inkjet has particular excellent storage stability and particular excellent discharge stability. Also, since the solvent was promptly removed from the composition for inkjet immediately after discharging by the inkjet method, it can be provided with particular excellent productivity of the recording material.

In the composition for inkjet of the present invention, the composition for inkjet preferably further includes at least one selected from silicone-based surfactants, polyoxyethylene-based surfactants, and acethylenic diol-based surfactants. Because of this, the composition for inkjet can be provided with particular excellent storage stability and particular excellent discharge stability. Also, the arrangement (sequence) of the metal powder on the recording material can be appropriate so that the recording material can be provided with a particular excellent glossy appearance and particular excellent abrasion resistance. In the composition for inkjet of the present invention, the binder resin preferably includes a compound having a cellulose backbone. Because of this, the recording material produced by using the composition for inkjet can be provided with excellent glossy appearance and excellent abrasion resistance.

In the composition for inkjet of the present invention, the binder resin preferably includes at least one selected from a group comprising cellulose acetate butyrate, nitrocellulose, and ethylcellulose. Because of this, the recording material produced by using the composition for inkjet can be provided with excellent glossy appearance and excellent abrasion resistance. The recording material of the present invention is produced by imparting the composition for inkjet on a recording medium. Because of this, the recording material having a pattern (printing part) with excellent glossy appearance and excellent abrasion resistance can be provided.

DETAILED DESCRIPTION OF EXEMPLARY EMBODIMENTS

Hereinafter, the preferred embodiments in the present invention will be explained in detail.

Composition for Inkjet

First, the detail about the composition for inkjet of the present invention will be explained. The composition for inkjet of the present invention is discharged by the inkjet method and includes a metal powder, an organic solvent, and a binder resin (binder).

By the way, conventionally, as a manufacturing method of a decorative product which presents glossy appearance, a metallic plating, a stamp-printing by using a metallic foil, a thermal transfer by using a metallic foil, or the like have been used. However, in these methods, there were problems such that it was difficult to form a fine pattern and it was difficult to perform an application to a curved surface part. Also, in the stamp-printing, there was a problem that a metal kind of gradation cannot be printed.

On the other hand, as a recording method for a recording medium by using compositions including pigments or colorants, an inkjet method is used. The inkjet method can be provided with excellent fine pattern of a formation and it is appropriate to perform the application to the curve surface part. Specifically, the composition (inkjet composition) that the coloring agent (pigments or colorants) was dispersed or dissolved in an organic solvent is used because it has advantages such that the thickness of a print layer becomes smaller, and an occurrence of unnecessary roughness can be prevented.

However, in the composition for inkjet, when the metal powder was used instead of the pigments or colorants, it had a problem that the glossy appearance, which is originally included in a characteristic of a metal, cannot be sufficiently demonstrated. Also, it caused problems such as a poor stability (storage stability) of the composition and the deterioration of the discharge stability caused by increasing the viscosity by the gelation. That is, the composition for inkjet of the present invention includes the metal powder, and the metal powder is treated by the surface preparation with the fluorinated silane compound and/or the fluorinated phosphate ester as a surface preparation agent. Because of this, in the composition for inkjet, it can be provided with excellent chemical stability and excellent dispersal stability. It can be also provided with excellent storage stability and excellent long term discharging stability. In the recording material produced by using the composition for inkjet, the metal powder can be appropriately arranged on the peripheral outer surface of the printing part so that the glossy appearance, which is originally included in a character of the metal material constituting the metal powder, can be sufficiently demonstrated. Also, even when the organic solvent, which has low surface tension, is used as the constituent material of the composition for inkjet, in the recording material produced by the composition for inkjet, the metal powder can be properly arranged (leafing) on the peripheral outer surface of the printing part so that the glossy appearance, which is originally included in a character of the metal material constituting the metal powder, can be sufficiently demonstrated. Accordingly, the selection of the organic solvent can be widened and without losing the glossy appearance which is originally included as a characteristic of the metal material, it can be easily adjusted the characteristics of the composition for inkjet and the characteristics of the recording material produced by using the composition for inkjet (for example, viscosity of the composition for inkjet, storage stability, discharge stability, abrasion resistance of the recording material, or the like).

Metal Powder

As described above, the composition for inkjet of the present invention includes the metal powder that is treated by the surface preparation with the fluorinated silane compound and/or the fluorinated phosphate ester as the surface preparation agent.

Mother-Particles

First of all, the detail about metal particles constituting mother-particles (particles processed by the surface preparation using the surface preparation agent) will be explained. It can be appropriate that the mother particles constituting the metal particles are constituted by at least a metal material in a region including the vicinity of the surface. For example, all of the region could be constituted by the metal material, and also, it can be possible to have a base portion formed by non-metallic material and a coated film formed by the metallic material to coat the base portion.

Also, for a metal material constituting mother particles, a metal or various alloys as elemental substances can be used but it is preferable that the mother particles are mainly constituted by Al on at least vicinity of the surface. Originally, among the various metal materials, Al has a particular excellent glossy appearance, but when the powder constituted by Al applied to the composition for inkjet, the storage stability of the composition became low particularly, and the present inventors have discovered a problem such as the deteriorate of the discharge stability caused by increasing the viscosity because the gelatinization was significantly generated. For this problem, in the present invention, even when the powder constituted by Al on the surface is used, the occurrence of the above described problem can be reliably prevented. That is, in the metal powder constituting the composition for inkjet, the powder constituted by Al is treated by the surface preparation with the surface preparation agent (fluorinated silane compound and/or fluorinated phosphate ester) so that the effect of the present invention is significantly demonstrated.

Also, the mother particles can be produced by any method, but when it is constituted by Al, the vapor deposition method can be used to form a film constituted by Al and after that, it is preferable to obtain the powder by crushing the film. By this process, the glossy appearance which is originally included in a characteristic of Al can be effectively appeared in a pattern (printing part) formed by using the composition for inkjet of the present invention. Also, the variability of the characteristics within the particles can be suppressed. Also, by using the method, the relatively-thin metal powder can be produced appropriately.

When the mother particles are produced by using this type of method, for example, by forming a film (film formation) constituted by Al on the base material, the mother particles can be produced appropriately. As a base material, for example, a plastic film such as polyethylene terephthalate, or the like can be used. Also, the base material can be included a parting agent layer on the surface of the film formation. Also, it is preferable that the crushing film is performed in liquid by giving supersonic vibration to the film. By this process, while the mother particles having the above described grain diameter can be easily and securely obtained, the generation of the various sizes, shapes, and characteristics within the particles can be suppressed.

Also, in the above described method, when performing the crushing film, as liquid, alcohol compounds such as methanol, ethanol, propanol, butanol, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene, ether compounds such as ethyl glycol dimethyl ether, ethylene glycol diethyl ether, ethylene glycol methylethyl ether, diethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl)ether, p-dioxane, and polar compounds such as propylene carbonate, γ-butyrolactone, N-methyl-2-pyrrolidone, N,N-dimethyl formamide (DMF), N,N-dimethyl acetamide (DMA), dimethyl sulfoxide, cyclohexanone, acetonitrile can be appropriately used. By using this type of the liquid, it can be prevented from the unexpected oxidation of the mother particles, and the excellent productivity of the mother particles and the metal powder can be provided and also, the possibility of generating various sizes, shapes, and characteristics within the particles can be small.

Surface Preparation Agent

As described above, the metal powder related to the present invention is treated by the surface preparation with fluorinated silane compound and/or fluorinated phosphate ester as the surface preparation agent. First of all, in the surface preparation agent, the detail about fluorinated silane compound will be explained. As fluorinated silane composition, a silane composition having at least one fluorine atom within a molecule can be used.

Specifically, it is preferred that the fluorinated silane composition as the surface preparation agent has a chemical formula shown in formula (1) below.

$$R^1 SiX^1_a R^2_{(3-a)} \tag{1}$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.)

Because of this, the composition for inkjet can be provided with excellent discharge stability and excellent storage stability, and a printing part of the recording material produced by using the composition for inkjet can be provided with excellent glossy appearance and excellent abrasion resistance. As $R^1$ in formula (1), for example, it can be alkyl group, alkenyl group, aryl group, aralkyl group in which a part or all of hydrogen atoms are substituted by fluorine atom. In addition, at least a part of hydrogen atoms (hydrogen atoms which are not substituted by fluorine atom) included in the molecular configuration can be substituted by amino group, carboxyl group, hydroxyl group, thiol group or the like, and hetero atom or benzene of aromatic ring such as —O—, —S—, —NH—, —N= can intervene within a carbon chain. For example, the concrete examples of $R^1$ are that a part or all of hydrogen atoms are substituted by fluorine atoms in phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group.

As a concrete example of the fluorinated silane compound shown in formula (1), it is preferable to include a composition having a configuration that a part or all of hydrogen atoms in a silane compound are substituted by fluorine atoms. The silane compounds are dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-iso-propoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl iso-propoxysilane, methyl-n-butyloxysilane, methyltri-sec-butyloxysilane, methyltri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl trimethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane 1,3-(trichlorosilyl methyl)heptacosane, dibenzyl dimethoxysilane, dibenzyl diethoxy silane, phenyl trimethoxysilane, phenyl methyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl trimethoxysilane, benzyl dimethoxysilane, benzyl diethoxysilane, benzyl methyl diethoxysilane, benzyl dimethy ethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane (amino ethyl amino methyl)phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl) trimethoxysilane, p-aminophenyl trimethoxysilane, p-aminophenyl ethoxysilane, m-aminophenyl trimethoxysilane, m-aminophenyl triethoxysilane, 3-aminopropyl trimethoxysilane, 3-aminopropyl triethoxysilane, ω-aminoundecyl trimethoxysilane, amyl triethoxysilane, benzoxazocinepine dimethyl ester, 5-(bicyclo heptenyl) triethoxysilane, his (2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl)phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl)ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl)ethyl trimethoxysilane, 2-(3-cyclohexenyl)ethyl triethoxysilane, 3-cyclohexenyl trichlorosilane, 2-(3-cyclohexenyl) ethyl trichlorosilane, 2-(3-cyclohexenyl)ethyl dimethyl chlorosilane, 2-(3-cyclohexenyl)ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino)propyl triethoxysilane, (dimethyl chlorosilyl)methyl-7,7-dimethyl amino lupinane, (cyclohexyl aminomethyl)methyl diethoxysilane, (3-cyclopenta dienylpropyl)triethoxysilane, N,N-diethyl-3-aminopropyl) trimethoxysilane, 2-(3,4-epoxycyclohexyl)ethyltrimethoxysilane, 2-(3,4-epoxycyclohexyl)ethyl triethoxysilane, (furfuryl oxymethyl)triethoxysilane, 2-hydroxy-4-(3-tri-ethoxy propoxy) diphenyl ketone, 3-(p-methoxyphenyl)propyl methyl dichlorosilane, 3-(p-methoxyphenyl)propyl trichlorosilane, p-(methylphenethyl) methyl dichlorosilane, p-(methylphenethyl)trichlorosilane, p-(methylphenethyl) dimethylchlorosilane, 3-morpholinopropyl trimethoxysilane, (3-glycidoxypropyl) methyldiethoxysilane, 3-glycidoxypropyl trimethoxysilane, 1,2,3,4,7,7-hexachloro-6-methyldiethoxysilyl-2-norbornene, 1, 2, 3, 4, 7, 7-hexachloro-6-triethoxysilyl-2-norbornene, 3-iodine propyl trimethoxysilane, 3-isocyanate propyl triethoxysilane, (mercaptomethyl)methyldiethoxysilane, 3-mercaptopropyl methyldimethoxy silane, 3-mercaptopropyl dimethoxysilane, 3-mercaptopropyl triethoxysilane, 3-methacryloxypropyl methyldiethoxysilane, 3-methacryloxypropyl trimethoxysilane, methyl-{2-(3-trimethoxysilyl propylamino)ethylamino}-3-propionate, 7-octenyl trimethoxysilane, R—N-α-phenethyl-N'-triethoxysilyl propyl urea, S—N-α-phenethyl-N'-triethoxysilylpropyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl)dimethylchlorosilane, (3-phenylpropyl)methyldichlorosilane, N-phenyl aminopropyl trimethoxysilane, N-(triethoxysilylpropyl)dansylamide, N-(3-triethoxysilylpropyl)-4,5-dihydroimidazole, 2-(triethoxysilylethyl)-5-(chloroacetoxy) bicycloheptane, (S)-N-triethoxysilylpropyl-O-menthocarbamate, 3-(triethoxysilylpropyl)-p-nitro-benzamide, 3-(triethoxysilyl)propyl succinate anhydride, N-[5-(trimethoxysilyl)-2-aza-1-oxo-pentyl]caprolactam, 2-(trimethoxysilylethyl) pyridine, N-(trimethoxysilylethyl)benzyl-N,N,N-trimethyl ammonium chloride, phenyl vinyl diethoxysilane, 3-thiocyanate propyltriethoxysilane, N-{3 acid (triethoxysilyl) propyl} phthalamide, 1-trimethoxysilyl-2-(chloromethyl)phenyl ethane, 2-(trimethoxysilyl)ethyl phenyl sulfonyl azide, β-trimethoxy silylethyl-2-pyridine, trimethoxysilylpropyl diethylene triamine, N-(3-trimethoxysilylpropyl)pyrrole, N-trimethoxysilylpropyl-N,N,N-tri-butyl ammonium bromide, N-trimethoxysilylpropyl-N,N,N-tributyl ammonium chloride, N-trimethoxysilylpropyl-N,N,N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl tri-phenoxysilane, vinyl tris-t-butoxysilane, adamantyl ethyl trichlorosilane, allyl phenyl trichlorosilane, (aminoethyl aminomethyl)phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl diisopropyl chlorosilane, phenethyl trichlorosilane, phenethyl dimethylchlorosilane, phenethyl methyldichlorosilane, 5-(bicyclo heptenyl) trichlorosilane 5-(bicyclo heptenyl)triethoxy silane, 2-(bicyclo heptyl) dimethylchlorosilane, 2-(bicyclo heptyl)trichlorosilane, 1,4-bis(trimethoxysilylethyl) benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl)phenethyl dimethylchlorosilane, p-(t-butyl) phenethyl trichlorosilane, 1,3-(dichloromethyl silylmethyl)heptacosane, ((chloromethyl) phenylethyl)dimethylchlorosilane, ((chloromethyl)phenylethyl) methyl dichlorosilane, ((chloromethyl)phenylethyl) trichlorosilane, ((chloromethyl)phenylethyl) trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorinated silane compound (surface preparation agent) has a perfluoroalkyl structure ($CnF_{2n+1}$). Because of this, the composition for inkjet can be provided with excellent discharge stability and excellent storage stability, and a printing part of the recording material produced by using the composition for inkjet can be produced with excellent glossy appearance and excellent abrasion resistance.

As a fluorinated silane compound having a perfluoroalkyl structure ($CnF_{2n+1}$), for example, it can be shown in formula (3) below.

$$C_nF_{2n+1}(CH_2)_mSiX^1{}_aR^2{}_{(3-a)} \quad (3)$$

(In formula (3), $X^1$ represents hydrolysis group, ether group, chloro group or hydroxyl group, $R^2$ represents alkyl group having a carbon number 1 to 4, n represents an integer between 1 to 14, m represents an integer between 2 to 6, and a represents an integer between 1 to 3.) The concrete examples of the compounds having such a structure are $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(CH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like. Also, as a fluorinated silane compound, it is also possible to use a perfluoroether structure ($C_nF_{2n+1}O$) instead of perfluoroalkyl structure ($C_nF_{2n+1}$). As a fluorinated silane compound having a perfluoroether structure ($C_nF_{2n+1}O$), for example, it can be shown in formula (4) below.

$$C_pF_{2p+1}O(C_pF_{2p}O)_r(CH_2)_mSiX^1{}_aR^2{}_{(3-a)} \quad (4)$$

(In formula (4), $X^1$ represents hydrolysis group, ether group, chloro group or hydroxyl group, $R^2$ represents alkyl group having a carbon number 1 to 4, p represents an integer between 1 to 4, r represents an integer less than 10, m represents an integer between 2 to 6, and a represents an integer between 1 to 3.)

The concrete examples of the compounds having such a structure are $CF_3O(CF_2O)_6$—$CH_2CH_2$—$Si(OC_2H_5)_3$, $CF_3O(C3F6O)_4$—$CH_2CH_2$—$Si(OCH_3)_3$, $CF_3O(C3F6O)_2(CF_2O)_3$—$CH_2CH_2$—$Si(OCH_3)_3$, $CF_3O(C3F6O)_8$—$CH_2CH_2$—$Si(OCH_3)_3$, $CF_3O(C4F9O)_5$—$CH_2CH_2$—$Si(OCH_3)_3$, $CF_3O(C4F9O)_5$—$CH_2CH_2$—$Si(CH_3)(OC_2H_5)_2$, $CF_3O(C3F6O)_4$—$CH_2CH_2$—$Si(C_2H_5)(OCH_3)_2$.

Next, among the surface preparation agents, the detail about a fluorinated phosphate ester will be explained. As the fluorinated phosphate ester, a phosphate ester having at least one fluorine atom within a molecule can be used. Specifically, it is preferable that the fluorinated phosphate ester as the surface preparation agent has a chemical formula shown in formula (2) below.

$$POR_n(OH)_{3-n} \quad (2)$$

(In formula (2), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer between 1 to 3, m represents an integer between 2 to 18, and l represents an integer between 1 to 18.)

Because of this, the composition for inkjet can be provided with particular excellent discharge stability and particular excellent storage stability, and a printing part of the recording material produced by using the composition for inkjet can be provided with a particular excellent glossy appearance and particular excellent abrasion resistance. In formula (2), it is preferable that m is an integer between 3 to 14, but an integer between 4 to 12 is more preferable. Thus, the above described effect can be more sufficiently demonstrated.

In addition, in formula (2), it is preferable that l is an integer between 1 to 14, but an integer between 1 to 10 is more preferable. Because of this, the above described effect can be more sufficiently demonstrated. Also, it is preferable that the fluorinated phosphate ester (surface preparation agent) has ($C_nF_{2n+1}$). Because of this, the composition for inkjet can be provided with excellent discharge stability and excellent storage stability, and a printing part of the recording material produced by using the composition for inkjet can be provided with excellent glossy appearance and excellent abrasion resistance.

The above surface preparation agent (fluorinated silane compound, fluorinated phosphate ester) can directly treat the mother particles, but it is preferable that after treating acid or base, the mother particles are treated by the surface preparation agent (fluorinated silane compound, fluorinated phosphate ester). Because of this, a modification provided by a chemical bonding to the surface of the mother particles treated by the surface preparation agent (fluorinated silane compound, fluorinated phosphate ester) can be securely performed so that the above described effect of the present invention can be more effectively demonstrated. As an acid, for example, it can be proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acide, nitrous acid, hyponitrous acid, phosphorous acid, and hypophosphorous acid, or the like. Among them, hydrochloric acid, phosphoric acid, and acetic acid can be preferable. On the other hand, as a base, for example, sodium hydrate, potassium hydrate, calcium hydrate, or the like can be used. Among them, sodium hydrate and potassium hydrate can be preferable.

The shape of the metal powder can be spherical shape, spindle shape, needle-shape, or the like, but scale like-shape can be preferable. Because of this, on the recording medium that the composition for inkjet is applied, a main surface of metal powder can be arranged along a surface shape of the recording medium so that the metal material constituting the metal powder, which is originally provided with glossy appearance or the like, can be more effectively demonstrated in an obtained recording medium. Also, the formed pattern (printing part) can be provided with excellent glossy appearance and excellent high-class appearance, and also, the recording material can be provided with excellent abrasion resistance. In addition, in a case that the surface preparation is not provided by the fluorinated silane compound and/or the fluorinated phosphate ester and the metal powder has scale-like shape, it significantly tends to become lower storage stability and discharge stability of the composition for inkjet. However, in the present invention, even when the metal powder has scale-like shape, the occurrence of this type of problem can be absolutely prevented. That is, when the shape of the metal powder is scale-like, the effect of the present invention is significantly demonstrated.

In the present invention, the scale-like shape is defined that an area as viewed from a predetermined angle (as viewed in a planar view) is bigger shape than an area as viewed in a direction perpendicular to an observation direction such as a plated-form or a curved plated-form. Specifically, a ratio between an area $S_1$ ($\mu m^2$) as viewed in a direction observed from where a profile area becomes maximum and an area $S_0$ ($\mu m^2$) as viewed in a direction observed from where an area as viewed in a direction perpendicular to an observation direction becomes maximum is preferably more than 2, and more preferably more than 5, and further preferably more than 8. For example, this value can be obtained by performing the observation for any 10 particles and averaging the calculated values for these particles.

The average grain diameter of the metal powder is preferably more than 500 nm and less than 3.0 µm and more preferably more than 800 nm and less than 1.8 µm. Because of this, the recording material produced by using the composition for inkjet can be provided with excellent glossy appearance and excellent high-class appearance. Also, the composition for inkjet can be provided with excellent storage stability and excellent discharge stability. The content rate of the metal powder in the composition for inkjet is preferably more than 0.5 mass % and less than 10.0 mass %, and more preferably, more than 1.0 mass % and less than 5.0 mass %.

Organic Solvent

The organic solvent has a function to disperse the metal powder in the composition for inkjet. And, the organic solvent is removed (vaporized) in the production process of the recording material. A boiling point of the organic solvent under one atmospheric pressure is preferably more than 100° C. and less than 300° C., and more preferably more than 150° C. and less than 250° C. Because of this, it can sufficiently provide excellent productivity of the recording material that the composition for inkjet is used. Also, particular excellent stability of the composition when the composition for inkjet is stored and particular excellent discharge stability can be provided.

As an organic solvent, it can be anything if the organic solvent is a liquid form in the environment usage of the composition for inkjet (for example, under at normal temperature (20° C.) and at normal pressure (one atmospheric pressure)), but for example, alcohol compounds (methyl alcohol, ethyl alcohol, propylene alcohol, butyl alcohol, monovalent alcohol such as isobutyl alcohol and ethylene glycol, multivalent alcohol such as glycerin, fluoride of these compounds, or the like), ketone compounds (acetone, methylethyl ketone, cyclohexanone, or the like), carboxylic acid ester compounds (methyl acetate, ethyl acetate, propyl acetate, butyl acetate, methyl propionate, ethyl propionate, or the like), ether compounds (diethyl ether, dipropyl ether, tetrahydrofuran, dioxane, or the like), lactone compounds, or the like can be used.

Specifically, the composition for inkjet preferably includes at least one compound selected from alkylene glycol compounds and lactone compounds. Because of this, the composition for inkjet can be provided with particular excellent storage stability and particular excellent discharge stability. Also, since the solvent can be promptly removed after discharging by the inkjet method, particular excellent productivity of the recording material can be provided.

As the alkylene compounds that can be used as an organic solvent, for example, it can be alkylene glycol such as ethylene glycol and propylene glycol, compounds that at least one hydroxyl group in the alkylene glycol is etherified or esterified, or the like. Also, as an alkylene glycol part of the alkylene glycol compounds, it can be ethylene glycol, diethylene glycol, triethylene glycol, tetraethylene glycol, propylene glycol, dipropylene glycol, tripropylene glycol, tetrapropylene glycol, or the like.

The concrete examples of alkylene glycol monoether are ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, or the like.

The concrete examples of alkylene glycol diether are ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or the like.

As the lactone compounds that can be used as an organic solvent, for example, it can be γ-butyrolactone, δ-valerolactone, ε-caprolactone, or the like. Among them, the organic solvent preferably includes at least one or two selected from a group comprising diethylene glycol dimethyl ether, diethylene glycol diethyle ether, tetraethylene glycol dimethyl ether, tetraethylene glycol dibutyl ether, and γ-butyrolactone. Because of this, the composition for inkjet can be provided with excellent storage stability and excellent discharge stability. The recording material can be provided with excellent glossy appearance and excellent high-class appearance.

The content rate of the organic solvent in the composition for inkjet is preferably more than 70 mass % and less than 99 mass %, and more preferably more than 80 mass % and less than 98 mass %. Because of this, the composition for inkjet can be provided with excellent storage stability and excellent discharge stability, and the recording material produced by using the composition for inkjet can be provided with excellent glossy appearance. By the way, the composition for inkjet can include more than two compositions as an organic solvent. In this case, it is preferable that the sum of the content rates of these compounds is in a range of the values as described above.

Binder Resin (Binder)

In the recording material produced by using the composition for inkjet, the binder resin has a function to improve adhesiveness of the metal powder to the recording material. Because of this, the recording material can be provided with excellent durability (abrasion resistance, water resistance).

As a binder resin constituting the composition for inkjet, for example, it can be acrylic resin, styrene-acrylic resin, rosin modified resin, terpene resin, polyester resin, polyamide resin, epoxy resin, vinyl chloride resin, vinyl chloride-vinyl acetate copolymer, cellulose-based resin (for example, cellulose acetate butyrate, hydroxypropyl cellulose), polyvinyl butyral, polyvinyl alcohol, polyurethane, or the like.

Specifically, as a binder resin, the composition for inkjet preferably includes a compound having a cellulose backbone. Because of this, the recording material produced by using the composition for inkjet can be provided with a particular excellent glossy appearance and particular excellent abrasion resistance. Among them, as a binder resin (a compound having a cellulose backbone), it is preferable to include at least one selected from a group comprising cellulose acetate butyrate, cellulose nitrate, and ethyl cellulose. Because of this, the recording material produced by using the composition for inkjet can be provided with excellent glossy appearance and excellent abrasion resistance.

In the composition for inkjet, the binder resin can be dispersed or dissolved in the organic solvent. The content rate of the binder resin (binder) in the composition for inkjet is preferably more than 0.1 mass % and less than 5.0 mass %, and more preferably more than 0.5 mass % and less than 2.0 mass %. Because of this, the composition for inkjet can be sufficiently provided with excellent storage stability and excellent discharge stability, and the recording material produced by using the composition for inkjet can be provided with excellent glossy appearance, excellent abrasion resistance, or the like. By the way, the composition for inkjet can include more than two compounds as a binder resin. In this case, it is preferable that the sum of the content rates of these compounds is preferably in a range of the values as described above.

Surfactant

In addition, the composition for inkjet preferably includes at least one selected from silicone-based surfactant, polyoxyethylene-based surfactant, and acetylene diol. Because of this, the composition for inkjet can be provided with particular excellent storage stability and particular excellent discharge stability. Also, the arrangement (sequence) of the metal powder on the recording material can be appropriate, and the recording material can be provided with excellent glossy appearance and excellent abrasion resistance.

As a silicone-based surfactant, for example, polyether-modified silicone (BYK-300, 306, 307; BYK Japan KK, KF-6011, 6012, 6017, 6015, 6043; Shin-Etsu Silicone Co., Ltd.), polyester-modified silicone (BYK-313, 315; BYK Japan KK), polyether-modified silicone acrylate-terminated (BYK-3500, 3510, 3530; BYK Japan KK), polyester-modified silicone acrylate-terminated (BYK-3570; BYK Japan KK), polyglycerol-modified silicone (KF-6100, 6104; Shin-Etsu Silicone Co., Ltd.), aminopropyl-modified silicone (KF-8015, 8020; Shin-Etsu Silicone Co., Ltd.), amino-modified silicone (KF-8004, 867S; Shin-Etsu Silicone Co., Ltd.), or the like can be used.

As a polyoxyethylene-based surfactant, for example, it can be polyoxyethylene alkylether such as polyoxyethylene cetyl ether (e.g., Nissan Nonion P-208; NOF Corporation), polyoxyethylene oleyl ether (e.g., Nissan Nonion E-2025, E-205S; NOF Corporation), or polyoxyethylene lauryl ether (e.g., Emulgen 106, 108; Kao Corporation), polyoxyethylene alkylphenol ethers such as polyoxyethylene octylphenol ether (e.g., Nissan Nonion HS-204, HS-206, HS-208; NOF Corporation), sorbitan monoester such as sorbitan monocaprylate (e.g., Nissan Nonion CP-08R; NOF Corporation), or sorbitan monolaurate (e.g., Nissan Nonion LP-20R, NOF Corporation), polyoxyethylene sorbitan monoester such as polyoxyethylene sorbitan monostearate (e.g., Nissan Nonion OT-221; NOF Corporation), polycarboxylic acid-based polymer activator (Flowlen G-700; Kyoeisha Chemical Co., Ltd.), polyoxyethylene higher alcohol ether (e.g., Emulgen 707, 709; Kao Corporation), tetraglycerol oleate (e.g., Poem J-4581; Riken Vitamin Co., Ltd.), nonylphenol ethoxylate (e.g., Adekatoru NP-620, NP-650, NP-660, NP-675, NP-683, NP-686; Asahi Denka Co., Ltd.), aliphatic phosphate ester (e.g., Adekakoru CS-141E, TS-230E; Asahi Denka Co., Ltd.), sorbitan sesquioleate (e.g., Sorugen 30; Dai-ichi Kogyo Seiyaku Co., Ltd.), sorbitan monooleate (e.g., Sorugen 40; Dai-ichi Kogyo Seiyaku Co., Ltd.), polyethylene glycol sorbitan monolaurate (e.g., Sorugen TW-20; Dai-ichi Kogyo Seiyaku Co., Ltd.), polyethylene glycol sorbitan monooleate (e.g., Sorugen TW-80; Dai-ichi Kogyo Seiyaku Co., Ltd.). As an acetylene diol, for example, Surfynol 104, 82, 465, 485, or TG (all available from Air Products and Chemicals Inc.), Olfine STG, Olfine E1010 (these are the trade name of Nissin Chemical Industry Co., Ltd.), or the like can be used.

The content rate of the above described surfactants in the composition for inkjet is preferably more than 0.01 mass % and less than 5.0 mass %, and more preferably more than 0.1 mass % and less than 2.0 mass %. Because of this, the composition for inkjet can be provided with excellent storage stability and excellent discharge stability, and the recording material produced by using the composition for inkjet can be provided with excellent glossy appearance, or the like. By the way, the composition for inkjet can include more than two compounds as surfactants as described above. In this case, it is preferable that the sum of the content rates of these compounds is in a range of the values as described above.

Other Components

The composition for inkjet of the present invention can include components (other components) besides the components discussed above. As these components, for example, it can be slip agents (leveling agents), dispersants, penetration enhancers, a pH adjusters, coloring agents (pigment, colorant), matting agents, waxes, antifungal agents, preservatives, antioxidants, chelating agents, thickeners, sensitizer (sensitizing dye), or the like.

When the composition for inkjet includes a slip agent, by leveling function, the surface of the recording material becomes smoother surface so that the abrasion resistance is improved. As a slip agent, it is not particularly limited, but for example, silicone surfactants of polyester modified-silicone, polyether modified-silicone, or the like can be used and it is preferable to use polyester modified-polydimethylsiloxane or polyether modified-polydimethylsiloxane. The viscosity of the composition for inkjet in the present invention at room temperature (20° C.) is preferably less than 20 mPa·s and more preferably more than 3 mPa·s and less than 15 mPa·s. Because of this, the ink droplet by the inkjet method can be properly performed.

Recording Material

Next, the detail about the recording material of the present invention will be explained. The recording material of the present invention is produced by imparting the above described composition for inkjet onto the recording medium. Such a recording material has a pattern (printing part) with excellent glossy appearance. The recording material of the present invention can be anything, but for example, papers (regular paper, exclusive paper, or the like), plastic materials such as vinyl chloride and propylene carbonate can be appropriately used.

The recording material of the present invention can be used for any purpose, and for example, it can be used for a decoration product or other purpose. As concrete examples of the present invention, it can be interior decorations for vehicles such as a console lid, a switch-base, a center cluster, an interior panel, an emblem, a center console, an indicator face plate, or the like. Also, it can be indicators such as a control part (type of key switch) of various electric devices, a decorative part demonstrating decorative characteristics, a guidepost, a logo, or the like.

As a droplet discharge method (inkjet method), a piezo method, a method that discharges ink from bubble generated by heating ink, or the like can be used, but from the viewpoint of the prevention of a property change in the composition for inkjet, the piezo method is preferable. A publicly known droplet discharge device can be used for performing the discharge of the composition for inkjet by using the inkjet method.

By removing the organic solvent, the composition for inkjet discharging to the recording material by the inkjet method loses fluidity in the formed printing part so that the formation becomes stabilized. When removing the organic solvent, a decompression treatment or a heating treatment can be used. Because of this, the efficiency of the organic solvent can be improved and excellent productivity of the recording material can be provided. Hereinbefore, the present invention was explained based on the preferred embodiments, but the present invention is not limited to these embodiments.

EXAMPLES

Next, the concrete examples of the present invention will be explained.

(1) Production of Composition for Inkjet Composition

Example 1

First of all, a film made by polyethylene terephthalate, which has a smooth surface, (surface roughness Ra is less than 0.02 μm) was prepared.

Next, silicone oil entirely applies to one side of the film surface. Next, a film constituting Al is formed on the surface, that the silicone oil was applied, by the evaporation method. Further, the film made by polyethylene terephthalate (base material), which constitutes the Al film, is soaked into the liquid constituted by diethylene glycol diethylester and the supersonic vibration is applied to it. Because of this, the powder made by Al that has scale-like shape (particles that should become mother particles) was obtained.

Next, the above obtained Al particles were put in 1 mass % propanol solution of $CF_3(CF_2)_4(CH_2)_2O$—$PO(OH)_2$ as the fluorinated phosphate ester and by stirring it for 10 seconds, the surface preparation was performed by the fluorinated phosphate ester so that the metal powder was obtained. The average grain diameter of the obtained metal powder is 0.8 μm, and the average thickness is 60 nm.

Next, the metal powder was mixed with diethylene glycol diethyl ether, γ-butyrolactone, tetraethylene glycol dimethyl ether, and tetraethylene glycol dibutyl ether as an organic solvent, cellulose acetate butyrate as a binder resin (binder), and BYK-3500 (BYK Chemie Company) as a silicone-based surfactant so that the composition for inkjet was obtained.

Examples 2 to 15

The constitution of the metal particles (types of the compounds (fluorinated compound) used for the composition of the mother particles and the surface preparation) is shown in table 1. The compositions for inkjet in these examples were produced in the same manner as the above described example 1 besides being the compositions as shown in table 1 by changing the types of raw materials and ratios used for preparing the compositions for inkjet.

Comparative Example 1

The composition for inkjet was produced in the same manner as the above described example 1 besides particles made by Al, which were not treated by the surface preparation, used as a metal powder.

Comparative Example 2

The composition for inkjet was produced in the same manner as the above described comparative example 1 besides using a spherical shape of the Al powder (not treated by the surface preparation) as a metal powder produced by using a gas atomization method.

Comparative Example 3

The composition for inkjet was produced in the same manner as the above described example 1 besides obtaining the metal powder treated by the surface preparation using $NH_3$—$(CH_2)_3$—$Si(OCH_3)_3$, which is not fluorinated silane composition and fluorinated phosphate ester, instead of $CF_3(CF_2)_4(CH_2)_2O$—$PO(OH)_2$ as fluorinated phosphate ester.

Comparative Example 4

The composition for inkjet was produced in the same manner as the above described example 1 besides obtaining the metal powder treated by the surface preparation using stearic acid, which is not fluorinated silane composition and fluorinated phosphate ester, instead of $CF_3(CF_2)_4(CH_2)_2O$—$PO(OH)_2$ as fluorinated phosphate ester.

Comparative Example 5

The composition for inkjet was produced in the same manner as the above described example 1 besides obtaining the metal powder treated by the surface preparation using oleic acid, which is not fluorinated silane composition and fluorinated phosphate ester, instead of $CF_3(CF_2)_4(CH_2)_2O$—$PO(OH)_2$ as fluorinated phosphate ester.

Regarding the above described examples and comparative examples, the components of the compositions for inkjet as a whole are shown in table 1. In the table, "A1" represents $CF_3(CF_2)_4(CH_2)_2O$—$PO(OH)_2$, "A2" represents $CF_3(CF_2)_7$—$CH_2CH_2$—$Si(OCH_3)_3$, "A3" represents $CF_3(CF_2)_5$—$CH_2CH_2$—$Si(OC_2H_5)_3$, "A4" represents $CF_3$—$CH_2CH_2$—$Si(OCH_3)_3$, "A'1" represents $NH_3$—$(CH_2)_3$—$Si(OCH_3)_3$, "A'2" represents stearic acid, "A'3" represents oleic acid, "DEGDEE" represents diethylene glycol diethyl ether, "DEGDME" represents diethylene glycol dimethyl ether, "TEGDME" represents tetraethylene glycol dimethyl ether, "TEGDBE" represents tetraethylene glycol dibutyl ether, "γ-BL" represents γ-butyrolactone, "NMP" represents 1-methyl-2-pyrolidone, "CAB" represents cellulose acetate butyrate, "NC" represents cellulose nitrate, "EC" represents ethyl cellulose, "HEC" represents hydroxyl ethyl cellulose, "B1" represents BYK-3500 (made by BYK Chemi Company, silicone-based surfactant), "B2" represents BYK-3570 (made by BYK Chemi Company, silicone-based surfactant), "B3" represents Olfine E1010 (made by Nissin Chemical Industry Co., Ltd., silicone-based surfactant), and "B4" represents Emulgen 106 (made by Kao Corporation, polyoxyethylene-based surfactant). Regarding example 11 in the table, the components of the constituent materials of the mother particles are shown as a ratio by weight for the content rates of respective elements. Also, by performing the observation of any 10 particles included in respective compositions for inkjet, the ratios ($S_1/S_0$) between an area $S_1$ ($\mu m^2$) (as viewed in a planer view) as viewed in a direction observed from where a profile area becomes maximum and an area $S_0$ ($\mu m^2$) as viewed in a direction observed from where an area as viewed in a direction perpendicular to an observation direction becomes maximum are calculated and these average values are show in table 1. In addition, by using vibration type viscometer, the viscosity of the compositions for inkjet in respective examples measured in reference with J1S Z8809 at 20° was in a range between 3 mPa·s and 15 mPa·s, respectively.

TABLE 1

| | Constitution of Metal Powder | | | | | Contents of Inkjet Composition | | | | | |
|---|---|---|---|---|---|---|---|---|---|---|---|
| | | | Metal Powder | | | | | Organic Solvent | | Binder Resin | Surfactant |
| | Constituent Material of Mother Particles | Materials Used for Surface Preparation | Shape | Average Grain Diameter (μm) | $S_1/S_0$ | Content Rate (Mass Part) | | Content Rate (Mass Part) | | Content Rate (Mass Part) | Content Rate (Mass Part) |
| Example 1 | A1 | A1 | Scale-like | 0.8 | 35 | 1.5 | DEGDEE/γ-BL/TEGDME/TEGDBE | 66.5/12.0/14.0/5.0 | CAB | 0.5 | B1 | 0.5 |
| Example 2 | A1 | A2 | Scale-like | 0.9 | 49 | 1.5 | DEGDEE/γ-BL/TEGDME/TEGDBE | 68.0/12.0/12.0/5.0 | CAB | 0.7 | B2 | 0.8 |
| Example 3 | A1 | A3 | Scale-like | 2.0 | 52 | 1.5 | DEGDEE/γ-BL/TEGDME | 71.5/12.0/14.0 | NC | 0.5 | B1 | 0.5 |
| Example 4 | A1 | A4 | Scale-like | 1.1 | 25 | 1.5 | DEGDME/TEGDME/TEGDBE | 82.7/10.0/5.0 | EC | 0.5 | B1 | 0.3 |
| Example 5 | A1 | A1 | Scale-like | 1.0 | 39 | 1.5 | DEGDEE/γ-BL/TEGDME/TEGDBE | 64.7/16.0/14.0/3.0 | CAB | 0.5 | B1 | 0.3 |
| Example 6 | A1 | A2 | Scale-like | 0.7 | 37 | 1.5 | DEGDEE/γ-BL/TEGDME/TEGDBE | 68.8/13.0/12.0/4.0 | CAB | 0.5 | B1 | 0.2 |
| Example 7 | A1 | A1 | Scale-like | 0.9 | 48 | 1.5 | DEGDEE/γ-BL/TEGDME | 73.5/10.0/14.0 | CAB | 0.5 | B1 | 0.5 |
| Example 8 | A1 | A2 | Scale-like | 1.5 | 71 | 1.5 | DEGDEE/TEGDME/TEGDBE | 83.5/10.0/4.0 | CAB | 0.5 | B1 | 0.4 |
| Example 9 | A1 | A1 | Scale-like | 1.8 | 19 | 1.5 | DEGDEE/γ-BL/TEGDME/TEGDBE | 70.6/10.0/14.0/3.0 | CAB | 0.5 | B3 | 0.4 |
| Example 10 | A1 | A2 | Scale-like | 1.5 | 22 | 1.5 | DEGDEE/γ-BL/TEGDME/TEGDBE | 66.6/12.0/14.0/5.0 | CAB | 0.5 | B1 | 0.4 |
| Example 11 | Ni49.5Fe0.5 | A2 | Scale-like | 2.3 | 95 | 1.0 | DEGDEE/γ-BL/TEGDME/TEGDBE | 66.6/12.0/14.0/5.0 | CAB | 0.5 | B1 | 0.4 |
| Example 12 | SUS316L | A4 | Scale-like | 2.9 | 112 | 1.0 | DEGDEE/γ-BL/TEGDME/TEGDBE | 66.6/12.0/14.0/5.0 | CAB | 0.5 | B1 | 0.4 |
| Example 13 | A1 | A1 + A2 | Scale-like | 0.8 | 50 | 1.5 | DEGDEE/γ-BL/TEGDME/TEGDBE | 66.6/12.0/14.0/5.0 | CAB | 0.5 | B1 | 0.5 |
| Example 14 | A1 | A1 | Scale-like | 0.7 | 50 | 1.5 | DEGDME/NMP/TEGDME/TEGDBE | 66.6/12.0/14.0/5.0 | CAB | 0.5 | B4 | 0.4 |
| Example 15 | A1 | A2 | Scale-like | 0.5 | 20 | 1.5 | DEGDEE/γ-BL/TEGDME/TEGDBE | 66.6/12.0/14.0/5.0 | CAB | 0.5 | B1 | 0.4 |
| Comparative Example 1 | A1 | — | Scale-like | 1.5 | 35 | 1.5 | DEGDEE/γ-BL/TEGDME/TEGDBE | 66.6/12.0/14.0/5.0 | HEC | 0.5 | B1 | 0.4 |
| Comparative Example 2 | A1 | — | Spherical | 1.5 | 10 | 1.5 | DEGDEE/γ-BL/TEGDME/TEGDBE | 66.6/12.0/14.0/5.0 | CAB | 0.5 | B1 | 0.4 |
| Comparative Example 3 | A1 | A'1 | Scale-like | 1.5 | 93 | 1.5 | DEGDEE/γ-BL/TEGDME/TEGDBE | 66.6/12.0/14.0/5.0 | CAB | 0.5 | B1 | 0.4 |
| Comparative Example 4 | A1 | A'2 | Scale-like | 1.5 | 67 | 1.5 | DEGDEE/γ-BL/TEGDME/TEGDBE | 66.6/12.0/14.0/5.0 | CAB | 0.5 | B1 | 0.4 |
| Comparative Example 5 | A1 | A'3 | Scale-like | 1.5 | 54 | 1.5 | DEGDEE/γ-BL/TEGDME/TEGDBE | 66.6/12.0/14.0/5.0 | CAB | 0.5 | B1 | 0.4 |

(2) Stability Evaluation of Droplet Discharge

Discharge Stability Evaluation

By using the compositions for inkjet in the respective examples and comparative examples as described above, the following test was performed for an evaluation.

First of all, a droplet discharge device equipped in a chamber (thermal chamber) and the compositions for inkjet in the respective examples and comparative examples as described above were prepared. In a condition that the drive waveform of piezo-element was optimized, the respective compositions for inkjet were dropped 2000000 times (2000000 drops) from each nozzle of the droplet discharge heads under the environment of 25° C., 55% RH so the sequence discharge of droplet was performed. After that, the droplet discharge device was turned off, and it was left for 240 hours in a condition that the respective inkjet compositions were filled in a flow channel of the droplet discharge device under the environment of 25° C., 55% RH.

After that, the droplet was sequentially performed 4000000 times (4000000 drops) from each nozzle of the droplet discharge heads under the environment of 25° C., 55% RH. After it was left for 150 hours, regarding the droplets of 4000000 times discharged from the nozzles specified in a peripheral central part of the droplet discharge heads, an average value of shift amount d, which was shifted from a central position that the respective droplets were targeted to land, was calculated so that the evaluation was made in accordance with 5 stages standard below. As this value becomes smaller, it can be said that an occurrence of a flying curve was prevented.

A: the average of shift amount d is less than 0.07 μm.
B: the average of shift amount d is more than 0.07 μm and less than 0.14 μm.
C: the average of shift amount d is more than 0.14 μm and less than 0.17 μm.
D: the average of shift amount d is more than 0.17 μm and less than 0.21 μm.
E: the average of shift amount d is more than 0.21 μm.

(3) Frequency Property of Composition for Inkjet

A droplet discharge device equipped in a chamber (thermal chamber) and the compositions for inkjet in the respective examples and comparative examples as described above were prepared. In a condition that the drive waveform of piezo-element was optimized, the droplet discharge was performed by changing the frequency of vibration (frequency) of the piezo-elements in all nozzles of the droplet discharging heads under the environment of 25° C., 55% RH. The droplet discharge time in the frequency was 10 minutes. At the point after discharging for 10 minutes, a frequency that numbers of non-discharged nozzles were less than 1% in all nozzle numbers is an actual usable maximum frequency so that the evaluation was made in an actual usable frequency range in accordance with 4 stages standard below. As this value becomes larger, it has an excellent frequency property.

A: more than 15 kHz.
B: more than 10 kHz and less than 15 kHz.
C: more than 5 kHz and less than 10 kHz.
D: less than 5 kHz.

(4) Storage Stability Evaluation of Composition for Inkjet

Long Term Stability Evaluation

Regarding each of the above described examples and comparative examples, after 40 days left under the environment of 40° C., by using the vibration type viscometer, the viscosity of the compositions for inkjet in each example measured in reference with JIS Z8809 at 20° C. was measured so as to calculate the percentage of rise of viscosity immediate after the production and the evaluation was made in accordance with standards below.

A: the percentage of rise of viscosity is less than 5%.
B: the percentage of rise of viscosity is more than 5% and less than 10%.
C: the percentage of rise of viscosity is more than 10% and less than 18%.
D: the percentage of rise of viscosity is more than 18% and less than 23%.
E: the percentage of rise of viscosity is more than 23% or a generation of a foreign object is recognized.

(5) Production of Recording Material

By using the compositions for inkjet of the respective examples and the comparative examples, an interior panel as a recording material was provided as follows. First of all, the compositions for inkjet were put in the inkjet apparatus. After that, the compositions for inkjet were discharged in a predetermined patter on a base material (recording medium) having a curved surface part formed by using the solvent inkjet media (IJS-RC-YF170; made by Mitsubishi Paper Mills Ltd.). After that, the organic solvent was removed by the heat treatment in a condition of 60° C. for 30 seconds so that an interior panel as a recording material was obtained. By using the above described method and by using the compositions for inkjet of the respective examples and the comparative examples, 10 interior panels (recording materials) were provided, respectively.

(6) Evaluation of Recording Material

The respective above obtained recording materials were evaluated as follows.

(6.1) Appearance Evaluation of Recording Materials

The respective recording materials provided in the respective examples and the comparative examples were visually evaluated in accordance with 7 stages standard below.

A: Extremely excellent appearance with a full of rich glossy appearance.
B: Excellent appearance with a full of rich glossy appearance.
C: Very good appearance with a rich glossy appearance.
D: Good appearance with a rich glossy appearance.
E: Slightly not-good appearance with an insufficient glossy appearance.
F: Not-good appearance with a weak glossy appearance.
G: Extremely no-good appearance with a weak glossy appearance.

(6.2) Degree of Glossiness

Regarding the pattern forming parts of the respective recording materials provided in the respective examples and comparative examples, by using the degree of glossiness (MINOLTA MULTI GLOSS 268), the degree of the glossiness measured in a flap angle 60° was evaluated in accordance with standards below.

A: Degree of glossiness more than 400.
B: Degree of glossiness more than 300 and less than 400.
C: Degree of glossiness more than 200 and less than 300.
D: Degree of glossiness less than 200.

(6.3) Abrasion Resistance

Regarding the recording materials related to the respective examples and comparative examples, the abrasion resistance test using polyethylene terephthalate film (Mitsubishi Plastic, Inc., DIAFOILG440E) was performed by using Sutherland rub tester in reference with JIS K5701 when 48 hours elapsed from the production of the recording materials. In the same method as discussed above (6.2), the degree of glossiness (flap angle 60°) for the recording materials was measured after the abrasion resistance test, and a decreasing rate of the degree of glossiness after the abrasion resistance test was calculated for the evaluation in accordance with standards below.

A: A decreasing rate of the degree of glossiness is less than 8%.

B: A decreasing rate of the degree of glossiness is more than 8% and less than 16%.

C: A decreasing rate of the degree of glossiness is more than 16% and less than 26%.

D: A decreasing rate of the degree of glossiness is more than 26% and less than 33%.

E: A decreasing rate of the degree of glossiness is less than 33% or the surface of the recording medium is exposed because the metal particles were come off.

These results are shown in table 2.

TABLE 2

|  | Discharge Stability | Frequency Characteristic | Long-Term Stability | Appearance of Recording Material | Degree of Glossiness | Abrasion Resistance |
|---|---|---|---|---|---|---|
| Example 1 | A | A | A | A | A | A |
| Example 2 | B | A | A | A | A | B |
| Example 3 | A | B | A | A | A | A |
| Example 4 | A | A | A | A | A | B |
| Example 5 | A | A | A | B | B | B |
| Example 6 | A | A | B | A | A | A |
| Example 7 | A | A | A | A | A | A |
| Example 8 | B | A | A | B | A | B |
| Example 9 | A | A | B | B | B | A |
| Example 10 | A | A | B | B | A | A |
| Example 11 | B | B | A | B | A | B |
| Example 12 | B | B | A | B | A | A |
| Example 13 | A | A | A | A | A | A |
| Example 14 | A | A | B | B | A | A |
| Example 15 | A | A | B | B | A | A |
| Comparative Example 1 | E | D | E | F | C | D |
| Comparative Example 2 | D | D | D | G | D | E |
| Comparative Example 3 | D | C | D | E | C | D |
| Comparative Example 4 | D | D | D | E | C | D |
| Comparative Example 5 | D | D | D | E | C | D |

As is clear from table 2, the compositions for inkjet in the present invention had excellent discharge stability of droplet and excellent storage stability. Also, the recording materials of the present invention had excellent glossy appearance, and the pattern forming parts had excellent abrasion resistance. On the other hand, the sufficient results were not obtained in the comparative examples.

What is claimed is:

1. A composition for inkjet adapted to be discharged by an inkjet method comprising:
   a metal powder having a surface, metal or metal alloy constituting at least the surface of the metal powder;
   an organic solvent; and
   a binder resin,
   wherein the surface of the metal powder is modified by chemical bonding with a fluorinated silane composition and/or a fluorinated phosphate ester as a surface preparation agent.

2. The composition for inkjet according to claim 1, wherein the metal powder constituting mainly Al on at least the surface treated by the surface preparation with the fluorinated silane compound and/or the fluorinated phosphate ester.

3. The composition for inkjet according to claim 1, wherein the metal powder has a scale-like shape.

4. The composition for inkjet according to claim 1, wherein the metal powder is treated by the surface preparation in the fluorinated silane compound having a chemical structure shown in formula (1) below $$R^1SiX^1_a R^2_{(3-a)} \qquad (1)$$

wherein, in formula (1), $R^1$ represents a hydrocarbon group in which a part or all of hydrogen atoms are substituted by fluorine atoms, $X^1$ represents hydrolysis group, ether group, chloro group or hydroxyl group, $R^2$ represents alkyl group having a carbon number 1 to 4, and a represents an integer between 1 to 3.

5. The composition for inkjet according to claim 1, wherein the metal powder is treated by the surface preparation in the fluorinated phosphate ester having a chemical structure shown in formula (2) below $$POR_n(OH)_{3-n} \qquad (2)$$

wherein, in formula (2), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer between 1 to 3, m represents an integer between 2 to 18, and l represents an integer between 1 to 18.

6. The composition for inkjet according to claim 1, wherein the surface preparation agent has a perfluoroalkyl structure.

7. The composition for inkjet according to claim 1, wherein an average grain diameter of the metal powder is more than 500 nm and less than 3.0 μm.

8. The composition for inkjet according to claim 1, wherein the organic solvent includes at least one compound selected from alkylene glycol compounds and lactone compounds.

9. The composition for inkjet according to claim 1, further comprising
at least one selected from silicone-based surfactants, polyoxyethylene-based surfactants, and acethylenic diol-based surfactants.

10. The composition for inkjet according to claim 1, wherein
the binder resin includes a compound having a cellulose backbone.

11. The composition for inkjet according to claim 1, wherein
the binder resin includes at least one selected from a group comprising cellulose acetate butyrate, nitrocellulose, and ethylcellulose.

12. A recording material produced by applying the composition for inkjet according to claim 1 on a recording medium.

* * * * *